United States Patent [19]

Henry

[11] 4,210,930
[45] Jul. 1, 1980

[54] APPROACH SYSTEM WITH SIMULATED DISPLAY OF RUNWAY LIGHTS AND GLIDE SLOPE INDICATOR

[76] Inventor: Richard D. Henry, R.D. #1, Clinton, Pa. 15026

[21] Appl. No.: 852,961

[22] Filed: Nov. 18, 1977

[51] Int. Cl.$^2$ .............................................. H04N 7/18
[52] U.S. Cl. .............................. 358/103; 340/27 NA; 343/108 R
[58] Field of Search ............... 358/103, 104, 113, 110; 340/26, 27 R, 27 NA; 343/108 R

[56] References Cited

U.S. PATENT DOCUMENTS

| | | | |
|---|---|---|---|
| 1,699,270 | 1/1929 | Baird | 358/110 |
| 2,083,292 | 6/1937 | Cawley | 358/110 |
| 2,155,471 | 4/1939 | Cawley | 358/110 |
| 2,225,097 | 12/1940 | Cawley | 358/113 |
| 2,288,871 | 7/1942 | Adams | 358/113 |
| 2,395,099 | 2/1946 | Cage | 358/113 |
| 2,429,933 | 10/1947 | Gibson | 358/110 |
| 2,458,654 | 1/1949 | Southworth | 358/110 |
| 2,571,163 | 10/1951 | Rines | 358/110 |
| 2,571,164 | 10/1951 | Rines | 358/110 |
| 2,668,869 | 2/1954 | Iams | 358/110 |
| 2,711,530 | 6/1955 | Rines | 358/110 |
| 2,711,534 | 6/1955 | Rines | 358/110 |
| 2,712,613 | 7/1955 | Garrison | 358/110 |
| 2,864,030 | 12/1958 | Rines | 358/110 |
| 2,944,151 | 7/1960 | Whitney | 358/103 |
| 2,945,089 | 7/1960 | Cage | 358/110 |
| 3,230,819 | 1/1966 | Noxon | 340/27 R |
| 3,403,399 | 9/1968 | Jacobs | 358/110 |
| 3,524,016 | 8/1970 | Jacobs | 358/110 |
| 3,671,963 | 6/1972 | Assouline | 340/27 NA |

*Primary Examiner*—Howard W. Britton
*Attorney, Agent, or Firm*—John A. Young

[57] ABSTRACT

An airborne image camera, its respective image scan plate and image Cathode Ray Tube (CRT) forms a display which simulates runway lights and Visual Approach Slope Indicator (VASI) for the pilot so that the display portrays what the pilot would see, were it not for limited visibility conditions. The on-board CRT continuously enacts and displays, according to position of the aircraft, what would otherwise be visible to him as the runway lights of an illuminated runway, were it not for obscured vision. This is obtainable by RF microwave signals from a plurality of emitters and reflectors which substitute RF energy for visible spectrum light, with the RF energy received and processed by instruments in the aircraft to create a continuous display on the CRT.

18 Claims, 14 Drawing Figures

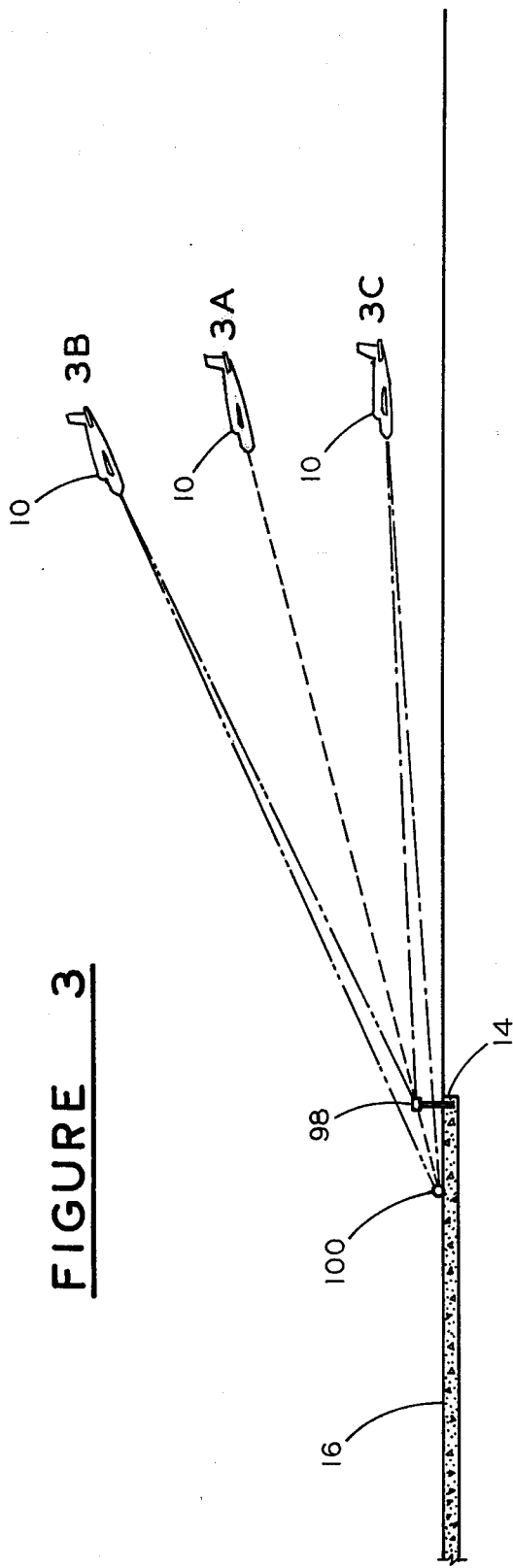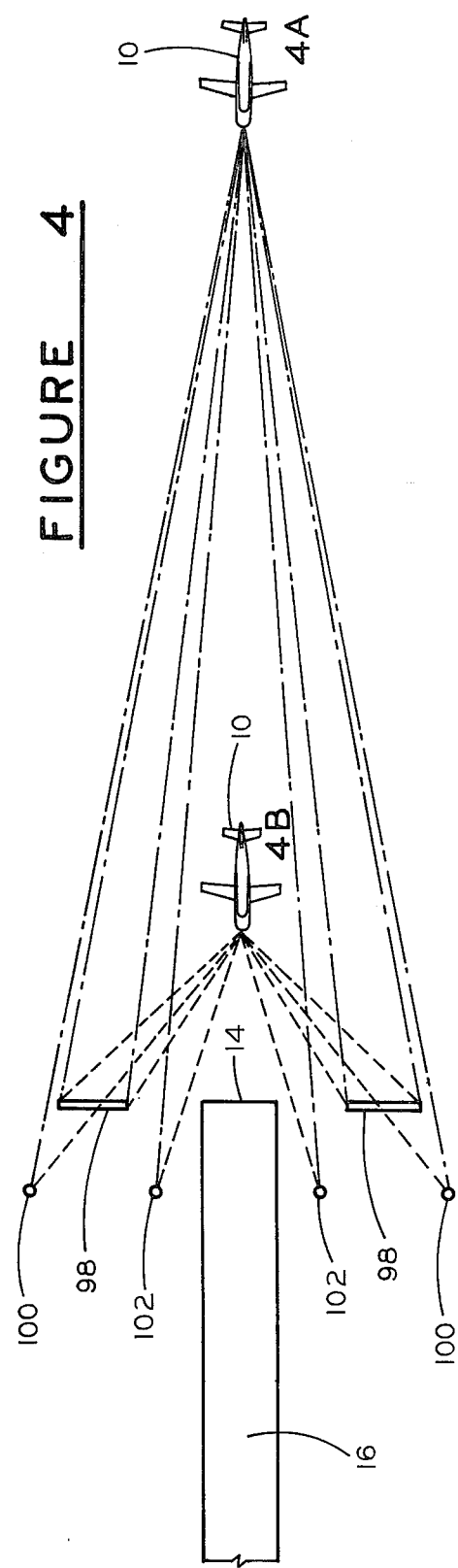

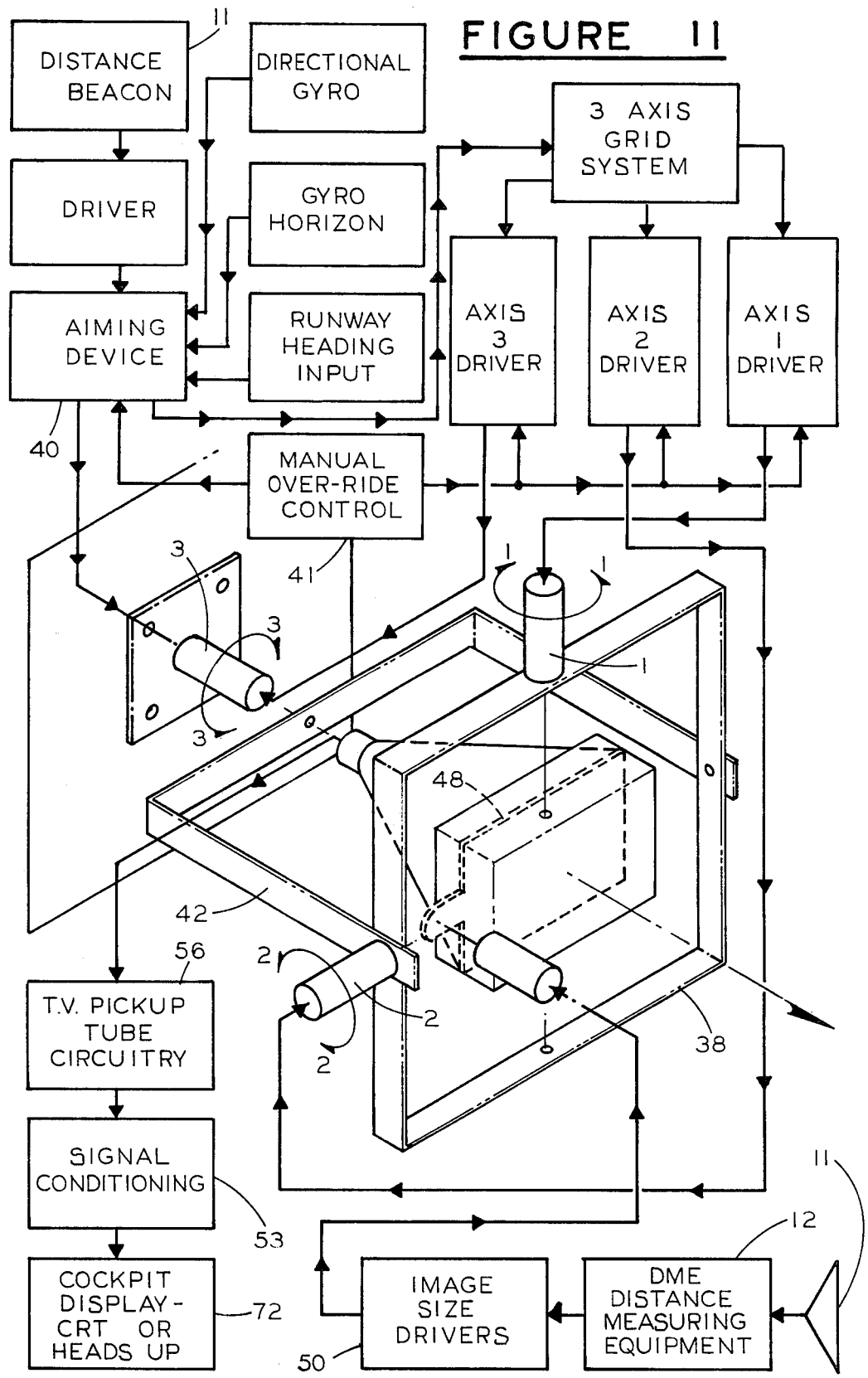

APPROACH SYSTEM WITH SIMULATED DISPLAY OF RUNWAY LIGHTS AND GLIDE SLOPE INDICATOR

BACKGROUND OF THE INVENTION

When weather conditions obscure the visibility of a landing, the runway lights are no longer visible; or, if visible, the distance of visibility is so restricted as to make their use of limited, and hence unreliable, value. This invention relates to a navigational system in which the pilot has available to him a display simulating runway lights and VASI equipment readout through a CRT. This is presented as a display on the CRT in the present invention, illustrating the runway lights and VASI as they would appear but for obscured vision from weather. In place of the visual light spectrum, which is shielded by fog or other weather conditions, there is displayed on the CRT, simulated lights and VASI.

The CRT is either in the form of a fixed display or heads-up display projected onto the windshield, so what the pilot sees is very similar to, if not precisely the same as, the visible landing light patterns on a runway as they would appear if visible.

The system is characterized by its simplicity in that in place of visible light there is utilized a microwave emitter and reflector antenna which is adapted to generate in conical patterns a series of emitted RF microwaves corresponding to what would otherwise be seen as visible light. On board the aircraft is a camera with a pinhole aperture which converts the received microwave signal to an inverted image on a screen which is positioned according to distance-measuring equipment (DME) to simulate by display size, as well as display location, what the pilot would otherwise observe as a series of visible runway lights. This on-board camera image is then converted to an electrical signal which is transmitted to, and then displayed on, a receiver such as a CRT.

The camera maintains the same parallel orientation through a gimbaled platform, so that regardless of the position of the aircraft, the camera is constantly aimed, and maintains aimed parallel positions, notwithstanding the changing orientation of the aircraft. Because the camera maintains its parallel aimed orientation at all times, the display on the CRT reflects what would be visible as runway ground lights were it not for restricted visibility.

There is presented on the CRT, a "painted" display from three dimensions, even though the CRT has a two-dimensional flat screen.

Other objects and features of the invention will become apparent from a consideration of the following description, which proceeds with reference to the accompanying drawings.

DRAWINGS

FIG. 3 is a side elevation view showing the glide slope indicator and approaching glide slopes of aircrafts (a), (b), and (c) corresponding to scope readouts of FIGS. 2A, 2B, and 2C, respectively;

FIG. 4 is a top view of a pilot on final approach at positions 4(A) and 4(B);

FIG. 11 is a block diagram of the airborne portion of the system in greater detail and of the ground elements constituting a complete system.

DETAILED DESCRIPTION OF THE INVENTION

Figure 1:
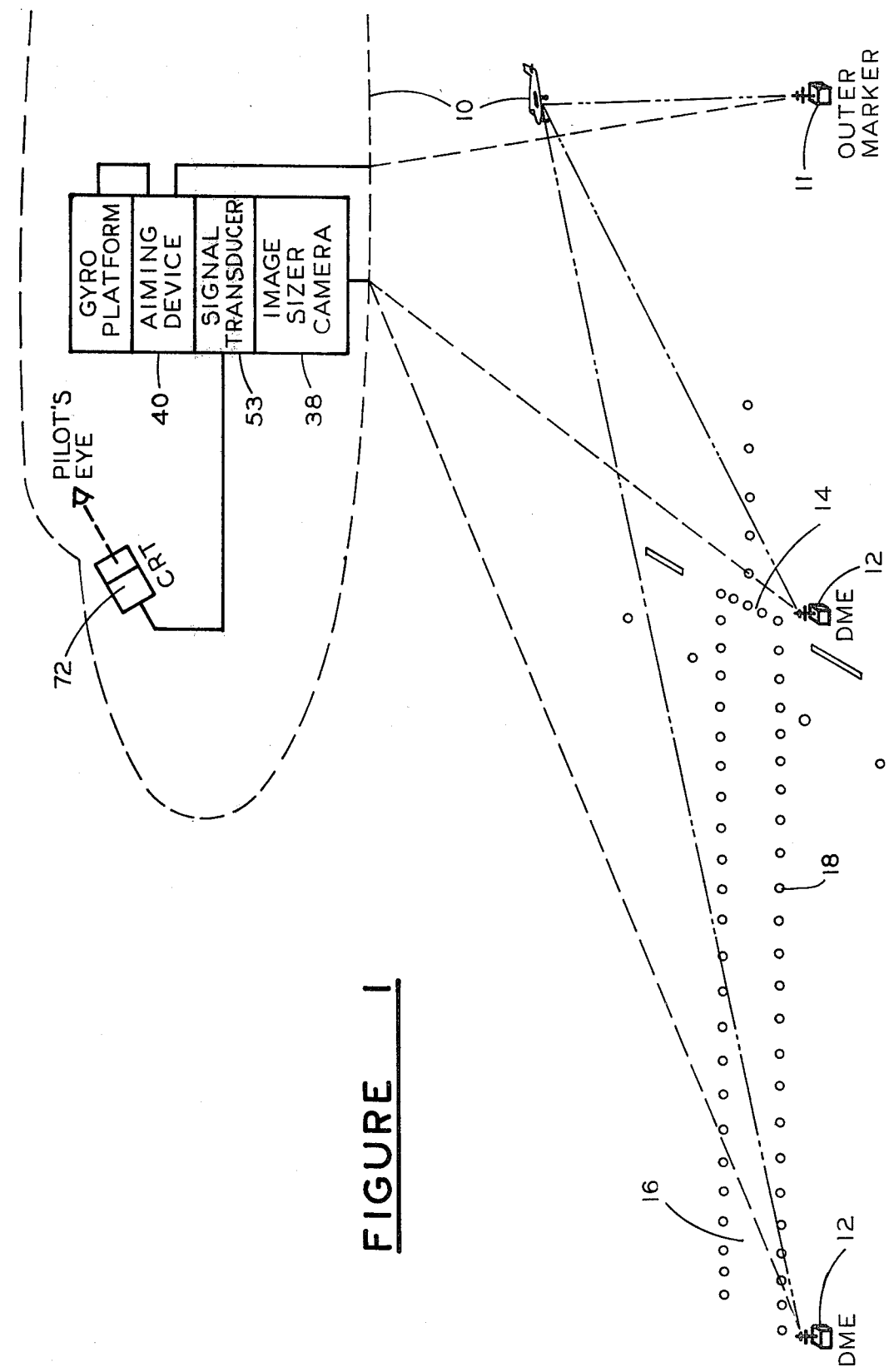
FIG. 1 is a schematic view showing the aircraft, elements of the navigational equipment within the aircraft as well as on the ground, and which are combined together to form both simulated runway lights and a VASI.

Referring to FIG. 1, an aircraft 10 while in flight employs airborne navigational equipment, including signals from certain ground-located devices such as a distance beacon 11 located a fixed distance from the runway and to which the approaching aircraft is vectored by great circles, and a transponder 12 forming Distance Measuring Equipment (DME) located at threshold 14 of a runway 16. The runway has a plurality of runway lights 18 spaced along each of opposite edges and which are normally visible under clear weather conditions; but during adverse weather conditions, those runway lights, as well as approach lights 19, are not observable by the pilot to aid in making a landing. Because the runway lights are at times invisible, there is an urgent need for reliable navigational information by which the pilot can line up the aircraft on final approach with the mid-length line of the runway 16 and at the appropriate glide slope. That is what the present invention provides; i.e., reliable navigational information enabling the pilot to line the aircraft on final approach with the mid-length of the runway 16, and to maintain this course. The pilot then "splits the runway", down the middle length, making a flareout just prior to touchdown, at the threshold 14 of the runway 16 under the appropriate sink rate, ground-and-air speed, and glide slope angle. This is accomplished with the help of a series of navigational aids which will next be described.

Figure 5:
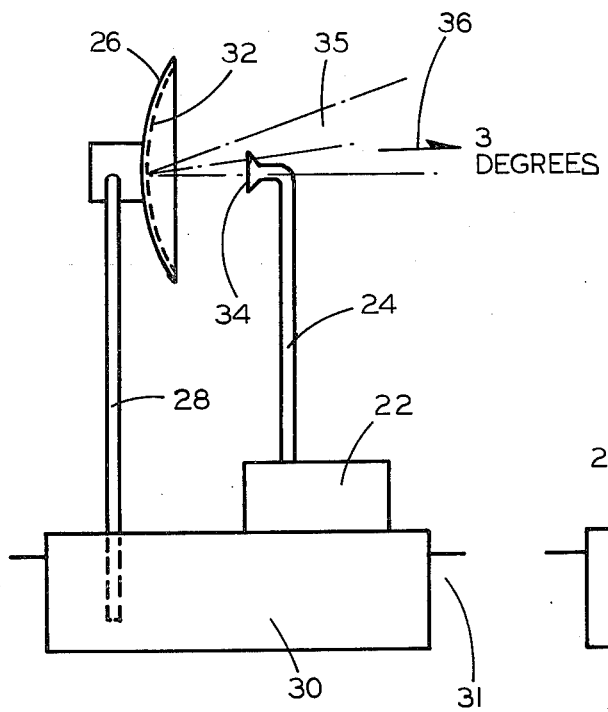
FIG. 5 is a side elevation view of a transmitter and reflector antenna, there being a reduced size one of these for each runway light along the edge of the runway and a larger version for the circular display forming the VASI at the end of the runway.
Figure 6:
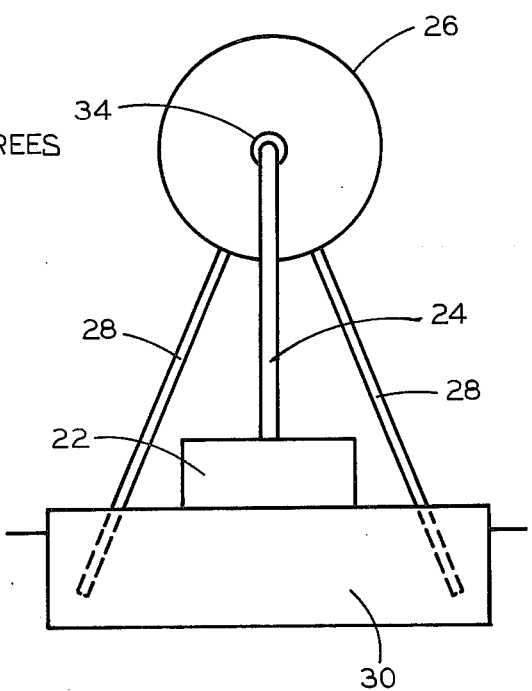
FIG. 6 is a front elevation view of FIG. 5.

In the vicinity of each runway edge light 18 (FIG. 59) is a transmitter 22 having a wave guide 24 which directs at 3° to the horizontal, a microwave-generated signal to a paraboloid reflector antenna 26 mounted on a stanchion 28. Both transmitter 22 and stanchion 28 are received in mounting base 30 held in the ground 31. The antenna 26 is intended as a microwave reflector and the transmitted microwave spectrum form a conical propagation pattern. The microwave dish 32 (FIG. 5) receives from microwave source 34, a series of waves, and projects such waves from the paraboloid reflector as outgoing waves 35 in the direction of the arrow 36. Microwaves are the counterpart of visible light and follow counterpart lenses and mirror systems. It is even possible to use one and the same lens or reflector to focus both light and microwave energy.

Microwave energy, while completely alike in kind and differing only in frequency from visible light, is not subject to reflection or obscuring by ground fog or other weather conditions which otherwise make the landing lights invisible. The microwaves can be treated as visible light, since for every optical lens or mirror system, a microwave counterpart is available. See Bernard Berkowitz's "Basic Microwaves", published by Hayden Book Company, Inc., New York, Copyright 1966 (Library of Congress Cat. Card No. 65-16814, USA).

What is accomplished by the present invention is to develop microwave energy sources which are made to appear as runway lights according to a simulated display on a CRT or image scan within the cockpit of the aircraft. In place of the visible light generated by the runway lights, the pilot will see, instead, the counterpart of such image within the cockpit. To accomplish this, there is an on-board (airborne) camera 38 which is responsive to an aiming device 40 responsively to manual control by the pilot upon arrival at beacon 11 and is mounted on a gyroscopically stabilized platform 42 (FIG. 11) to maintain a view of the runway which remains parallel to the original aimed direction regardless of pitch, yaw, roll, elevation, or course of the aircraft.

Figure 10:
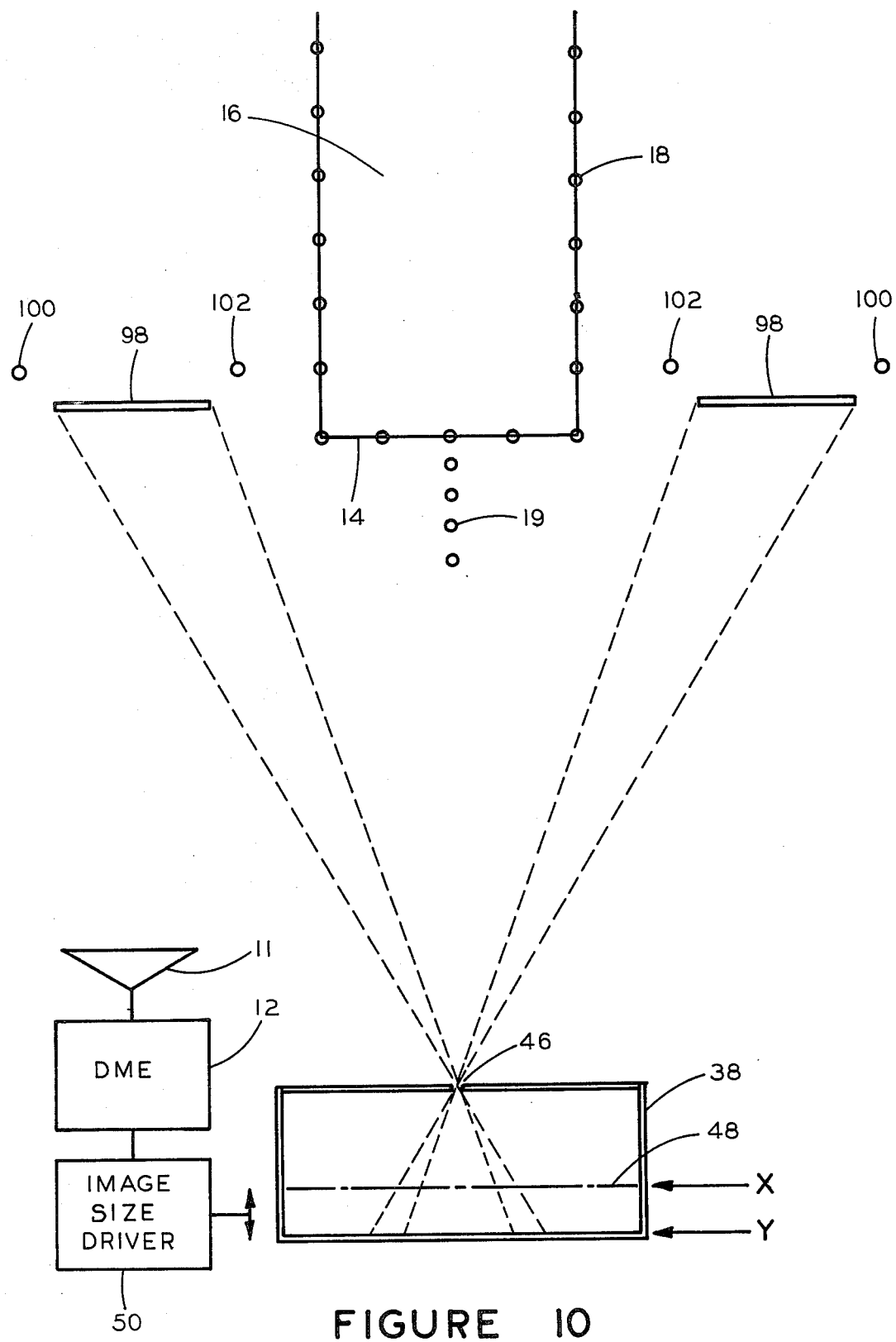
FIG. 10 is a section view of the airborne pinhole camera with the image plane adjustable between the "X" and "Y" positions by Distance Measuring Equipment (DME)

The multiple microwave emissions developed from the separate emitter-reflector combinations and corresponding to each runway light are passed through a pinhole 46 of the camera and projected onto a screen 48. The screen 48 is movable from the "X" position to the "Y" position (FIG. 10) by an actuator 50 which moves responsively to a transponder DME beacon 12 located at the threshold 14 of the runway 16. The transponder beacon 12, upon receiving a designated signal from the aircraft in the form of a coded series of pulses, emits a radio signal of its own that is also codeable. In this manner, there is provided a distance measuring between the aircraft and runway which in turn positions the screen 48 and determines the size of the display produced by the CRT on the aircraft. Image size is thus related to distance.

The signal received from the transponder continuously controls the distance X . . . Y and, hence, the image size produced on the screen or focal plane 48. The image is a reversal of the image through the pinpoint aperture 46. As the aircraft approaches the end of the runway during the final landing phase it may be deemed desirable to reduce the physical size of objects being viewed associated with the logical resultant increased in field of view or wide angle effect by movement of image scan plate from position "Y" progressively in the direction of position "X". If one were to use an airborne camera without picture sizing then as the aircraft approaches the end of the runway all objects being viewed would obviously increase in physical size, but manual or automatic image sizing may be desirable if one were to consider that by moving the image scan plate a greater distance from the aperture the image of all objects being viewed would increase their respective physical size but would be accompanied with a logical reduction of field of view as is with any camera with a normal zoom lens. At long range or a great distance from the runway to zoom in for an enlarged picture may be desirable but would be undesirable during the final landing phase due to the narrow field of view; therefore, by moving the image scan plate or cathode toward the aperture, a resultant image size decrease would occur accompanied with a logical obvious increased field of view or wide angle effect. A narrow field of view at long range would not present a problem, but would be highly undesirable at short range close in, therefore automatic control of sizing by coupling to DME 12 is well within the state of the art and may be deemed desirable. An alternate method of moving the aperture plate is also well within the state of the art. 64,66 facing opposite parabolic reflector antennae 68,70 which are mounted on a frame 72 and stanchions 74,76 set in a concrete base 78. In this way, the wave propagation extends in opposite directions to guide aircraft in the manner described, whether the approach is at either of opposite ends of the runway. The dished antennae may have small parabolic indentations throughout their surfaces to effect greater efficiency of wave progagation. The antennae are set to form conical wave emissions at 3° to the horizontal.

The image which appears on the focal plane 48 of the airborne camera is also subject to modification to be dim or bright, depending upon the size of the pinhole aperture 46, which is of variable size, being adjustable in size responsively to the DME 12. Thus, when the aircraft is a considerable distance from the runway, the aperture is relatively small, and as the aircraft 10 approaches the runway 16, the aperture 46 is made correspondingly larger.

The aiming device 40 aims the camera 38 once the aircraft is at the distance beacon 11 and is headed toward the runway 16. The platform 42 holds the aimed position by means of three axis grid systems (FIG. 11), each with an axis driver at trunions 1,2,3, which orientate the camera about 1—1, 2—2, 3—3 axes to hold the camera in aimed position. A manual override aiming device 41 (FIG. 11) is also included.

The image portrayed on the image plane 48 is converted to an electrical signal by a transmitter or TV pick-up circuitry which utilizes the image from the photoelectric surface of the airborne camera.

In back of the image focussed on the image scanning plate or plane 48, is the usual signal conditioning apparatus 53 consisting of lens 49, photoelectric surface 51, wire mesh screen 58, decelerating ring 61 and anode wall coating 63. A dynode 65 and electron multiplier metal disc 67, together with an electric gun 69, scanning beam 71 and H&V deflecting coils 73, is used to convert the video signal to an electrical signal. The resulting electrical signal is then transmitted to CRT 72 by conductor 78. At CRT 72, an electron beam passes through a four-coil first and second anode 70,75, H&V deflector yoke 77, anode connection 79, and fluorescent screen 83 of CRT 72, to create a visual paint-out or image, on the CRT screen. There are the usual controls 74,76, a control grid 85 focus coil 87, ion trap 89, heater 91, and amplifier detector 93.

Figure 2A:
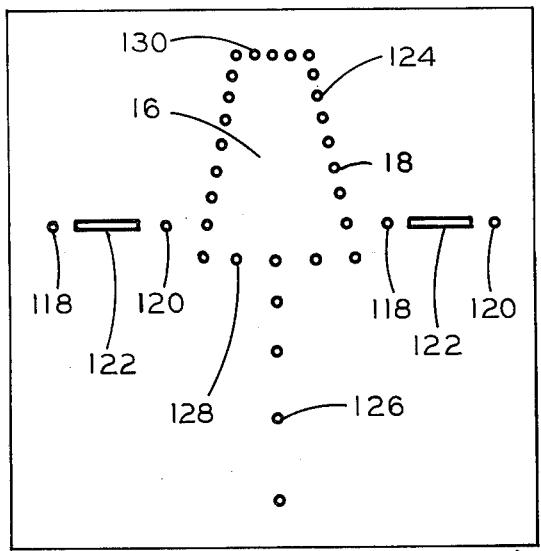
FIG. 2A illustrates the pattern observable on the CRT while the pilot is making a final approach at the correct glide slope.
Figure 2B:
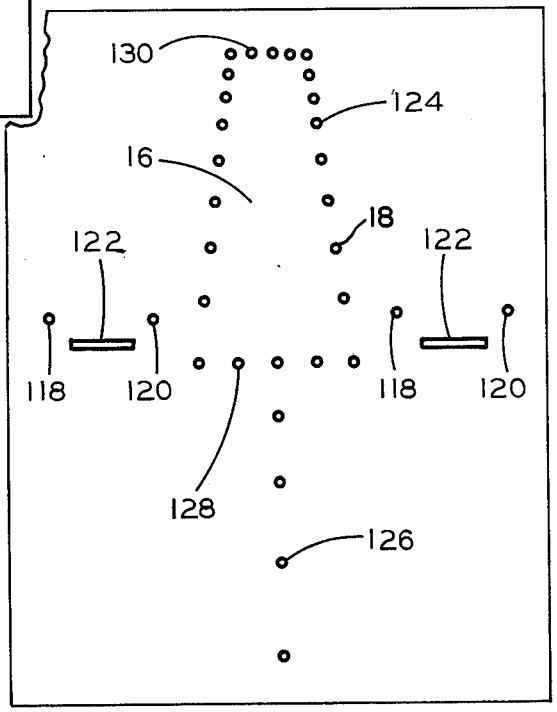
FIG. 2B illustrates the pilot on the correct, final, approach, but with too steep a glide slope.
Figure 2C:
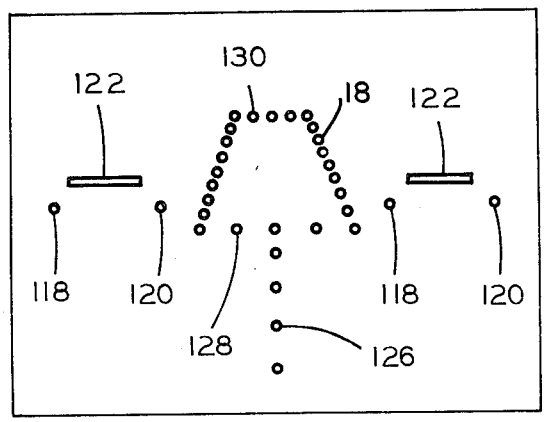
FIG. 2C illustrates a too-shallow glide slope.
Figure 7:
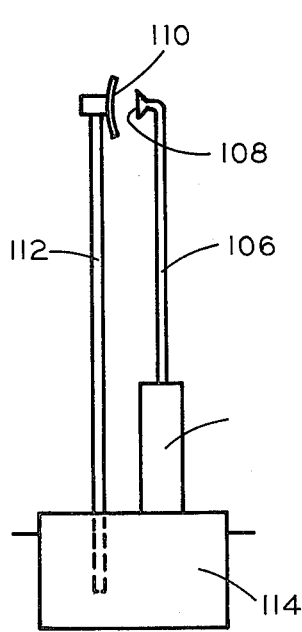
FIG. 7 illustrates the bar element of the VASI in side elevation view and forming part of the VASI.
Figure 8:
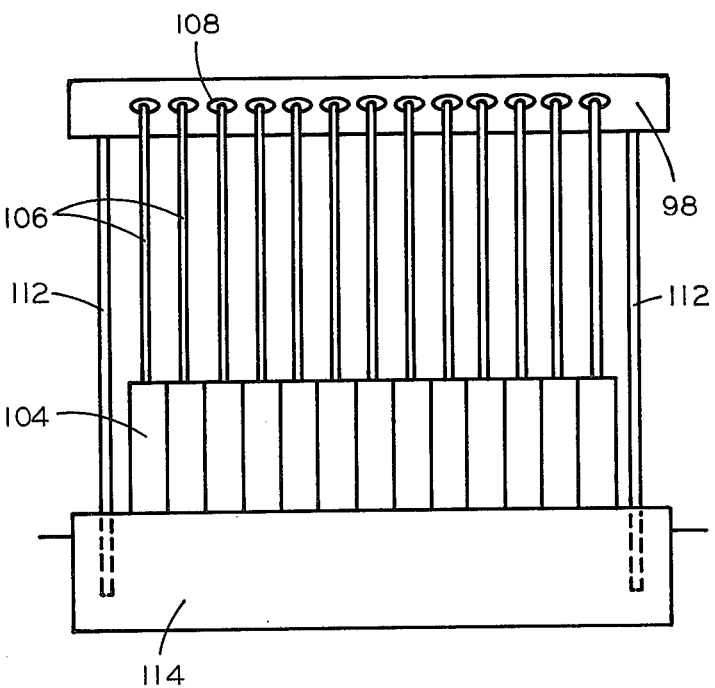
FIG. 8 is a front elevation view of FIG. 7.

Once the pilot lines the aircraft 10 with the runway 16 according to the image portrayed on the CRT, or heads-up display, whichever is preferred, there comes in view a VASI consisting of a VASI bar 98, and two circular VASI displays 100,102, one on each side of the bar 98 (FIGS. 3,4). For each of the VASI bars, there is a gang of transmitters 104 (FIG. 8), each with wave guides 106 having a signal emitting open-end 108 (FIG. 7) which is directed onto a bar reflector 110 at the end of a mounting stanchion 112 received in a concrete base 114. Similarly, there is a transmitter, antenna reflector, wave guide and stanchion associated with the circular display 100,102 of the VASI. The CRT display 72 converts the microwave emitted signals so that, referring to FIG. 2A, at the correct glide slope, the two circular CRT displays 118,120 appear colinearly with the CRT bar display 122, there being a pair of such displays, with the runway 16 therebetween. If the two circular displays 118,120 appear above the bar 122 as indicated in FIG. 2B, this means that the aircraft is approaching at too steep a glide slope, and, as shown in FIG. 2C, should the two circular displays 118,120 appear below the bar display 122, this signifies that the pilot is approaching at too shallow a glide slope. The way in which this is accomplished is that the circular 100,102 and bar-shaped reflector antennae 98 are disposed in vertically offset relation to each other (FIG. 3), and are horizontally displaced (FIG. 4) so that they subtend an angle of 3° such that a plane passed through the bar 98 and circular display antenna 100,102 form an angle to the horizon equal to the glide slope. Thus, the two displays appear colinear on the CRT even when there is zero visibility, according to the display produced by the microwave emitters. Further details of the manner in which the VASI is operative by visual approach are disclosed in Henry U.S. Pat. No. 3,813,657 issued May 28, 1974, titled, "GLIDE SLOPE INDICATOR".

At the same time there appears on the screen a series of circular lights 124 corresponding to the runway lights (FIGS. 2A,2B,2C); circular display lights 126 corresponding to the approach lights and threshold display lights 128,130 corresponding to the runway end lights. This represents a full showing of the runway.

In each respect, the displays on the CRT 72 of the circular 118,120 and bar-shaped elements 122 of the VASI, as well as the runway light display, are the same as they would appear visibly, should there not be light-obstructing conditions such as cloudiness, rain, snow, ground fog and the like.

In other words, the ground lights and the VASI equipment are displayed either on a CRT or heads-up display, so that the pilot has accurate information concerning the glide slope and course of the aircraft relative to the runway on final approach. The size of the CRT display, as well as the location of various elements of the display which reproduce the runway lights and VASI equipment, portray in a three-dimensional sense what the pilot would see were the same elements visible, but are rendered invisible during a blind approach.

Figure 9:
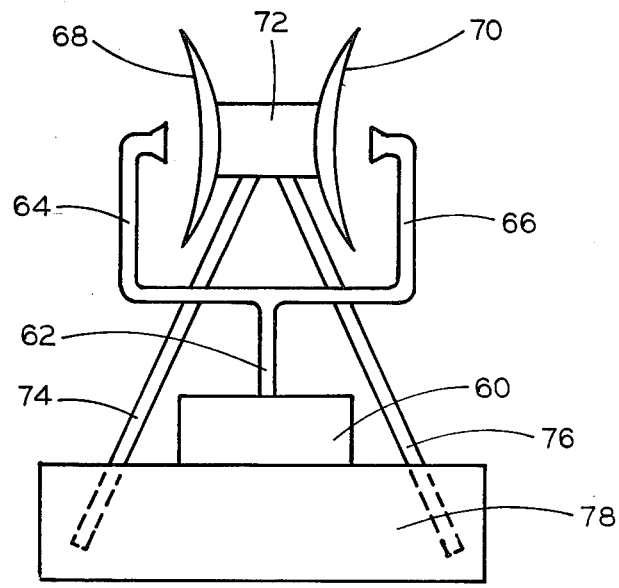
FIG. 9 illustrates a second embodiment transmitter with a split waveguide tee feed in which the emitter is adapted to "look" in both runway directions for aircraft landing from either end of the runway.
Figure 12:
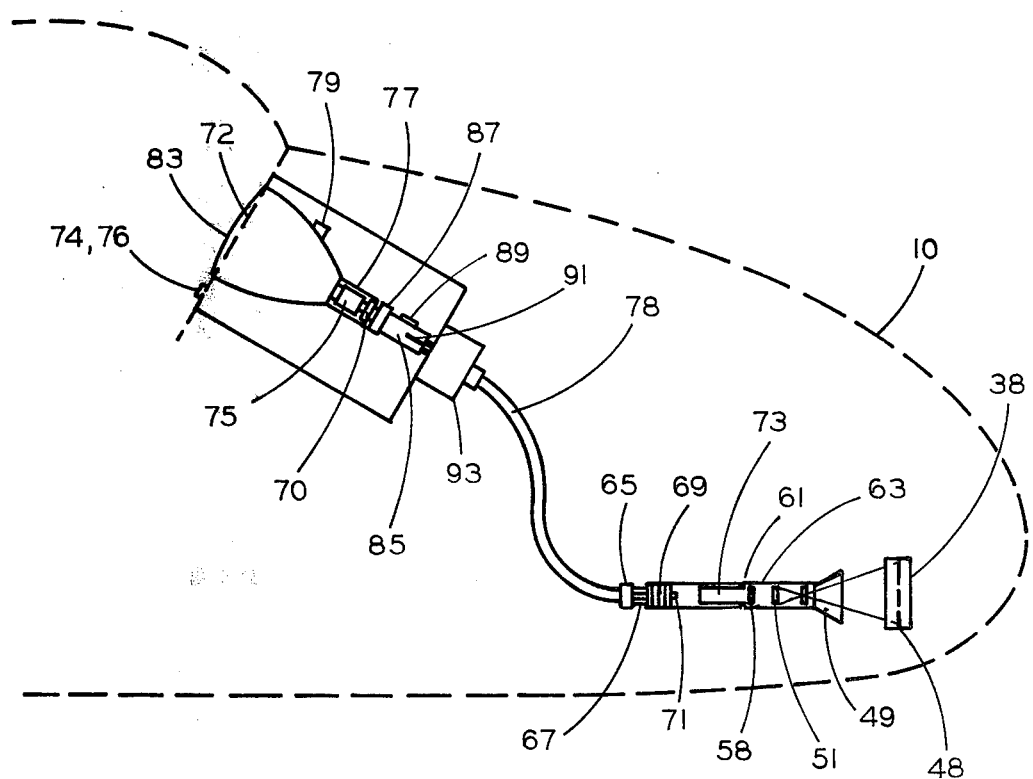
FIG. 12 is a schematic view of the CRT or heads-up airborne display which portrays typically the displays of FIGS. 2A, 2B, and 2C.

Because the microwave emitters (FIG. 9) face opposite directions of the runway 16, and, further, since there is a VASI consisting of a pair of circular displays 100,102, and a bar-shaped display 98, one at each side and at both ends of the runway, the pilot has the described guidance whether approaching from one or the other of opposite ends of the runway 16. The circular and bar-shaped VASI displays 98,100,102 are adjustable, to provide the prescribed glide slope, which can vary, but which is typically about 3° to the horizon. The glide slope is changeable by varying the height of the bar elements 98 relative to the circular elements 100,102 (FIG. 3), or vice versa, and this will determine the glide slope of the aircraft as it approaches the threshold of the runway.

The total effect of the display is to enable the pilot to establish, on final approach, the position of the aircraft relative to the runway so that the aircraft follows a glide path in vertical alignment with the center line of the runway 16 and descends at a glide slope of the prescribed angle.

Under these conditions, and with the correct aircraft speed, the landing aircraft then flares out at the end of the runway 16, and, having established the correct sink speed, air speed, ground speed, aircraft alignment and glide slope, makes an accurate and safe landing at a correct location on the runway and at a speed well within the stopping ability of the aircraft, taking into account the length of the runway.

OPERATION

In operation, as the aircraft approaches a designated runway, the on-board camera 38 is aimed toward the runway lights 18 and it maintains its sighting, irrespective of the roll, pitch, and yaw. This is accomplished by means of the gimbaled platform on the aircraft, so that the display on the photosensitive image plane of the camera remains the same regardless of the aircraft position. Details of this are well within the skill of the art and are fully set forth in such devices as U.S. Pat. No. 3,307,191, dated Feb. 28, 1967, titled, "AIRCRAFT BLIND LANDING DEVICE AND FLIGHT DIRECTOR SYSTEM", and U.S. Pat. No. 3,383,679, titled, "VISUAL LANDING SIMULATOR FOR INSTRUMENT FLYING", dated May 14, 1968, and issued to Roger P. Baird, Jr.

The Instrument Landing System (ILS) is used in conjunction with the DME transponders 12 located in the vicinity of the threshold 14 of the runway 16. Once the on-board camera 38 is aimed at the runway, it will produce a CRT display irrespective of visual landing conditions. When the visible runway lights and VASI are obscured by weather such as snow, fog, rain, etc., the system of the present invention provides a backup to visual approach utilizing a CRT display or heads-up display, or both, substituting microwave frequency from an emitter disposed one in place of each of the runway lights. In lieu of the visible runway light pattern and VASI, there is a display developed from microwave energy sources which substitutes for visible light rays. As each microwave emitting source passes through the pinhole of the camera, there is an identical but image-reversed portrayal on the focal or scan plate 48 of the camera 38, which is then converted by TV pickup tube circuitry 56 to electrical impulses and transmitted through a cable 78 and signal conditioning 53 to a CRT or heads-up display 72. When the pilot is on final approach, the glide slope is determined by a combination of the microwave emissions from the circular display 100,102 and the bar display 98, which again are painted onto the CRT (FIGS. 2A, 2B, 2C) with the circular "lights" 118,120 appearing above the bar 122 (FIG. 2B) when the aircraft is at too steep an approach; and, the circular lights 118,120 appear below the bar lights 122 (FIG. 2C) when the pilot is approaching at a too-shallow approach angle. The circular 118,120 and bar 122 displays appear colinearly (FIG. 2A) when the pilot is at the correct slope of approximately 3° (FIG. 3, position 3A). The glide slope can be varied by changing the height of the bar display 98 in relation to the circular display 100 (FIG. 3) so that the circular 118,120 and bar lights 122 appear colinearly at steeper or shallower approach angles. In any event, the VASI lights, instead of emitting visible light, which is obscured by weather conditions, emit a circular and bar pattern of microwave energy, which, as previously described, has an optical counterpart, and the microwaves are reflected and made to appear as circular and bar lights when the microwaves emitted from the paraboloid reflector antennae are displayed onto the CRT as circular and bar lights respectively.

The VASI equipment thus utilized in microwave form, is utilized by the pilot to establish and maintain the correct glide slope the same as is the case where the VASI equipment utilizes visible light and weather conditions permit the viewing of such display, all of this being more fully described in issued U.S. Pat. No. 3,813,657.

When it is desired to approach the opposite end of the runway, the same display is provided both in terms of the VASI and the runway lights, there being a separate and independently operatable VASI equipment at each of opposite ends of the runway. Each runway light 18 has a microwave emitter 60 (FIG. 9) which splits the wave energy equally between two waveguide arms 64,66 because when energy is fed to arm 62, it divides equally between the arms 64,66 and is directed onto oppositely facing paraboloid dished antennae 68,70 so that there is made to appear a microwave counterpart for each runway light for an approaching aircraft, whether the landing is made from one or the opposite end of the runway. These coupling devices and "magic T's" do not form a part of the present invention, but are well within the skill of the art to provide, being fully described in "MICROWAVE COMPONENTS", page 142, S127 of Berkowitz' on "Basic Microwaves" published by Hayden Book Co., Inc., NY, Copyright 1966 (Lib. of Cong. Cat. Card No. 65-16814).

A paraboloid reflector antenna is so designed as to emanate waves in approximately conical wave pattern so that the counterpart for the runway light is visible as the aircraft is approaching the runway in either of opposite directions for the landing. Even from a distance, the microwave emitters are "visible" to the on-board camera 38 which is aimed either manually or by aiming device 40 responsively to distance marker 11 and held aimed by gyroscopically stabilized platform 42 (FIG. 11). At a long range distance such as at outer marker 11 location the image scan plate or cathode may be responsively controlled to position "Y", FIG. 10, by coupling to DME 12, FIG. 1, which will achieve a zoom or enlargement effect of object images being viewed. As the aircraft moves toward the runway, the scan plate is progressively moved toward position "X", so as to reduce the object image sizes with an accompanied broadened field of view or wide angle effect similar to the pilot's normal side or peripheral vision to improve divergent display during final landing phase and flare out. The pilot has, then, at all times, a painted CRT image of the runway lights which corresponds in size, intensity, pattern, and location approximately the same as runway lights would appear visually under favorable weather conditions.

On final approach, the VASI lights, in this case circular and barlike, become visible by a microwave counterpart and the pilot utilizes the portrayal of the circular and bar "lights" which utilize microwaves in lieu of visible light spectrum to give the pilot a direct, painted image on the CRT of his glide slope. The glide slope is monitored in terms of the circular lights being above, below, or colinear with the rectangular bar the same as would be the case if the visible lights from the VASI were available for direct view.

In operation, after the pilot has passed over the outer marker distance station 11, and has been vectored through a great circle onto the approach path, the camera 38 is then aimed and turned on. Being gyroscopically stabilized on a platform in the manner indicated by U.S. Pat. No. 3,481,208, issued Dec. 2, 1969, titled, "STABILIZED PLATFORM WITH CANTILEVERED GIMBALS", assigned to Litton Systems; U.S. Pat. No. 3,052,129, issued Dec. 4, 1962, titled, "GYROSCOPIC REFERENCE SYSTEM":; and No. 3,355,954, issued Dec. 5, 1967, titled, "STABILIZED PLATFORM", issued Dec. 5, 1967, and assigned to Sperry Rand Corp. The aimed camera will remain sighted toward the runway and enable the pilot to visually determine from the VASI whether he is on the correct glide slope. If the runway lights appear to the right or the left on the center of the display tube, suitable corrections are made in the direction of final approach. The field of vision of the display on the CRT is sufficient to allow for 10–12 miles of offset from the correct line of approach which bisects the runway. The runway display, then, provides the pilot with an indication of whether he is on the correct glide slope and on the correct flight course in relation to the median plane of the runway. After having made the correct adjustments in course so that the runway lights are bisected by the vertical hairline of the CRT display, the pilot can maintain the correct course and glide slope until the threshold 14 of the runway 16 is reached, at which time flareout is made and landing accomplished at the correct air speed, sink speed, glide slope, and course, in relation to the middle of the runway.

A so-called zero-zero landing can thus be accomplished with a high degree of accuracy. Because the CRT image is "distance" related, as the pilot approaches the runway, the pilot has a direct "feel", visually, as to how close he is coming to the runway and how to make last-minute adjustments either to the right or to the left of the median plane of the runway, as well as last-minute adjustments in the glide slope, and air speed. The impression given the pilot on the display, whether it be a heads-up display or a CRT display, is of the runway lights approaching and then rushing past the sides of the aircraft so that there is substituted for an actual visual presentation of runway lights, an almost exact duplication of the events which would otherwise occur were the runway lights fully visible and not obscured by fog, rain, snow, or the like.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. In combination with an improved landing system for blind flight approaches, during which landing lights are nonvisible;

an airborne navigational device for assisting in landing operations by locating runway and approach landing operations, comprising a plurality of microwave emitters disposed at spaced locations along the length of a runway and at approximately the same locations as the runway lights thereon, a reflector associated one with each of said microwave emitters and reflecting such wave energy in opposite directions corresponding to the opposite ends of said runway, airborne camera means adapted to produce an image responsively to the microwave frequency received from said on-ground reflector means, gyroscopic mean for mounting said airborne camera to provide a display which is independent of the orientation of the aircraft, means for converting the image provided by said camera to a transmittable electrical signal form, and a display tube coupled with said camera and receiving said electrical signal to provide a visual readout of the runway as a series of lights which correspond to runway lights that would normally appear as visible lights under favorable weather conditions.

2. Apparatus in accordance with claim 1 including a DME transponder, an on-board interrogation signal which interrogates the ground beacon transponder, and means responsive to said interrogation signal and ground beacon to control the scan plate distance within said airborne camera to provide a visual readout of the runway appearance in accordance with the distance of the aircraft from the runway.

3. The apparatus in accordance with claim 1 wherein said reflector means includes a plurality of parabolic reflectors disposed over the surface of said reflector to form a conical pattern of display emissions.

4. The apparatus in accordance with claim 1 including a gyroscopically stabilized platform for maintaining said camera at a given disposition independently of the pitch, roll, or yaw of the aircraft.

5. The apparatus in accordance with claim 1 including toggle switches forming aiming means to provide initial orientation of said camera to compensate for precession of said gyrostabilized platform.

6. The apparatus in accordance with claim 1 including a distance measuring equipment coupled to said display camera means to control the aperture of said camera, and manual override control means to adjust the display size, intensity of the displayed image.

7. The apparatus in accordance with claim 1 wherein said camera includes a focussing lens comprised of glass.

8. The apparatus in accordance with claim 1 wherein said camera includes a focussing lens comprised of plastic.

9. The apparatus in accordance with claim 1 wherein said camera includes a focussing lens formed of a peephole configuration.

10. Process and apparatus in accordance with claim 1 in which said display is portrayed on a two-dimensional screen.

11. The apparatus in accordance with claim 1 in which said camera includes a pinhole aperture and adjusting means for said aperture responsive to a ground operating transponder beacon in the vicinity of the runway.

12. The apparatus in accordance with claim 11 including a heads-up display, and means for transducing the image of said airborne camera to said visual heads-up display.

13. The navigation apparatus in accordance with claim 1 including two dissimilarly shaped microwave emitting elements which appear colinearly at the correct approach angle and which appear noncolinearly when the approaching aircraft is flying above and below the appropriate approach angle.

14. The apparatus in accordance with claim 13 in which said dissimilarly shaped articles are of different heights and are horizontally offset at ground level so that an inclined plane encompassing both said objects subtends an angle to the earth which is equal to the correct slope angle for approaching and landing aircraft.

15. The apparatus in accordance with claim 14 wherein said dissimilarly shaped objects consist of round VASI emitters disposed at an elevated position and at a location near the end of the runway and said bar microwave emitter is a non-elevated emitter located at a position displaced in the direction of the runway.

16. A process for aiding the navigation of aircraft during zero, or limited, visibility conditions comprising the steps of: emitting a microwave signal at spaced locations along the length of the runway and at opposite edges thereof approximating the placement of runway lights, converting the received microwave energy on an approaching aircraft to a visual readout through an on-board camera means by transducing microwave frequency and signal pickup to a compatible CRT signal and thereafter scanning and presenting the received camera image on a cathode ray display to simulate the runway lights of an otherwise invisible runway.

17. The process in accordance with claim 16 including the step of continuously measuring the distance of the aircraft from the runway, and processing the received camera image so that its appearance is modified by the illusion of distance and spatial orientation on the readout cathode ray display.

18. Process and apparatus in accordance with claim 16 in which said display is portrayed on a two-dimensional screen.

* * * * *